(12) United States Patent
Monson (10) Patent No.: US 6,178,613 B1
(45) Date of Patent: *Jan. 30, 2001

(54) METHOD FOR IMPROVING MOTORCYCLE BRAKING

(76) Inventor: Brant Monson, 3875 N. Cove Dr., Provo, UT (US) 84606

( * ) Notice: Under 35 U.S.C. 154(b), the term of this patent shall be extended for 0 days.

This patent is subject to a terminal disclaimer.

(21) Appl. No.: 09/471,627

(22) Filed: Dec. 24, 1999

Related U.S. Application Data (63) Continuation of application No. 08/988,945, filed on Dec. 11, 1997, now abandoned, which is a continuation-in-part of application No. 08/763,516, filed on Dec. 11, 1996, now Pat. No. 5,826,463.

(51) Int. Cl.[7] .................................................... B21K 21/16

(52) U.S. Cl. ........................ 29/401.1; 29/434; 29/426.1; 74/512; 74/560; 74/564

(58) Field of Search ................................. 29/401.1, 426.1, 29/434; 74/512, 560, 564; 180/219

(56) References Cited

U.S. PATENT DOCUMENTS

| | | |
|---|---|---|
| 1,001,504 | 8/1911 | Cary . |
| 1,102,940 * | 7/1914 | Merchant ................................ 74/512 |
| 1,328,400 | 1/1920 | Reich . |

(List continued on next page.)

FOREIGN PATENT DOCUMENTS

| | | |
|---|---|---|
| 2241050 | 8/1991 | (GB) . |
| 60-50063 | 3/1985 | (JP) . |
| 4-27687 | 1/1992 | (JP) . |
| 7906201 | 2/1981 | (NL) . |

OTHER PUBLICATIONS

Harley Davidson Catalogue 1914–1921 pp. 42–43.
1915 Harley Davidson Advertisement.
Indian America's Pioneer Motorcycle.
Harley Davidson Catalogue pp. 84–91.
V–Twin Manufacturing Catalogue pp. 230–239.
1984 Genuine Motorcycle Accessories Catalogue pp. 49, 55, 57.
1993 V–Twin Manufacturing Catalogue pp. 172–174.
Custom Chrome Catalogue (Identified as pp. TC 0000024–TC 0000026).
1987 Custom Chrome Catalogue (Identified as pp. TC 0000027–TC0000028).
1988 Custom Chrome Catalogue (Identified as pp. TC 000029–TC0000030).
Custom Chrome Catalogue (Identified as pp. TC 000031–TC 0000032).
Custom Chrome Catalogue (Identified as pp. TC 0000033, TC0000035 and TC0000036).
1991 Custom Chrome Catalogue pp. TC 0000037–TC0000040).
1992 Custom Chrome Catalogue pp. TC 0000041, TC0000042 and 331–333.
Custom Chrome Catalogue pp. TC 0000046 anb 397–400.

*Primary Examiner*—S. Thomas Hughes
*Assistant Examiner*—Essama Omgba
(74) *Attorney, Agent, or Firm*—Morriss, Bateman, O'Bryant & Compagni (57) ABSTRACT

A method for improving motorcycle braking includes selecting a motorcycle brake with an actuator arm and a brake pad arm disposed at an angle of 50–65 degrees from one another, and attaching the brake to a motorcycle. Preferably, the brake is attached to a motorcycle having foot boards and disposed at an angle of between about 20 and 35 degrees relative to the foot board.

20 Claims, 11 Drawing Sheets

U.S. PATENT DOCUMENTS

| | | |
|---|---|---|
| 1,629,381 | 5/1927 | Hill . |
| 2,131,889 | 10/1938 | Holmes . |
| 2,212,355 | 8/1940 | Sherman . |
| 3,733,922 | 5/1973 | Tripp . |
| 3,853,020 | 12/1974 | Clark, III . |
| 3,911,760 * | 10/1975 | Elbers et al. .............................. 74/512 |
| 3,939,726 | 2/1976 | Ahrens . |
| 4,002,084 | 1/1977 | Martins . |
| 4,043,217 * | 8/1977 | Kleist ...................................... 74/470 |
| 4,083,263 | 4/1978 | Lundquist . |
| 4,174,852 * | 11/1979 | Panzica et al. ....................... 280/291 |
| 4,295,385 | 10/1981 | Huttenhow . |
| 4,299,139 | 11/1981 | Krüger et al. . |
| 4,456,090 | 6/1984 | Malenotti . |
| 4,633,727 | 1/1987 | Pike . |
| 4,802,684 * | 2/1989 | Bennett et al. ....................... 280/291 |
| 4,923,027 * | 5/1990 | Hayashi et al. ....................... 180/219 |
| 5,074,163 | 12/1991 | Baumann . |
| 5,354,086 | 10/1994 | Mueller . |
| 5,476,162 * | 12/1995 | Reed et al. ............................ 188/344 |
| 5,555,774 | 9/1996 | Lauring et al. . |
| 5,609,069 | 3/1997 | Swenson . |
| 5,662,195 * | 9/1997 | Rush .................................... 192/3.51 |
| 5,779,254 * | 7/1998 | James et al. ......................... 280/291 |
| 5,826,463 | 10/1998 | Monson . |

* cited by examiner

METHOD FOR IMPROVING MOTORCYCLE BRAKING

RELATED APPLICATIONS

The present application is a continuation of Ser. No. 08/988,945 filed Dec. 11, 1997 now abandoned, which is a continuation-in-part application of U.S. patent application Ser. No. 08/763,516 which was filed Dec. 11, 1996 U.S. Pat. No. 5,826,463, which is expressly incorporated herein, and to which Applicant claims priority.

BACKGROUND OF THE INVENTION

1. Field of the Invention

The present invention relates to a brake for motorcycles, and, more particularly, to a foot brake for use with motorcycles having foot boards on which the user may rest his or her feet while riding.

2. State of the Art

The use of large motorcycles, such as Harley-Davidsons, has found a renewed popularity in recent years. The popularity of such motorcycles which have foot boards instead of conventional foot pegs has increased at an even faster rate. The foot boards enable the rider to place his or her feet on a small board on each side of the motorcycle while riding.

The foot board used with the motorcycle is advantageous because the rider's foot is able to rest flat on the foot board, rather than resting on a foot peg, which provides minimal support. Those familiar with motorcycle touring will appreciate that the foot pegs provide little support for the lower leg, and can often result in sore ankles, etc., after long rides.

Figure 1A:
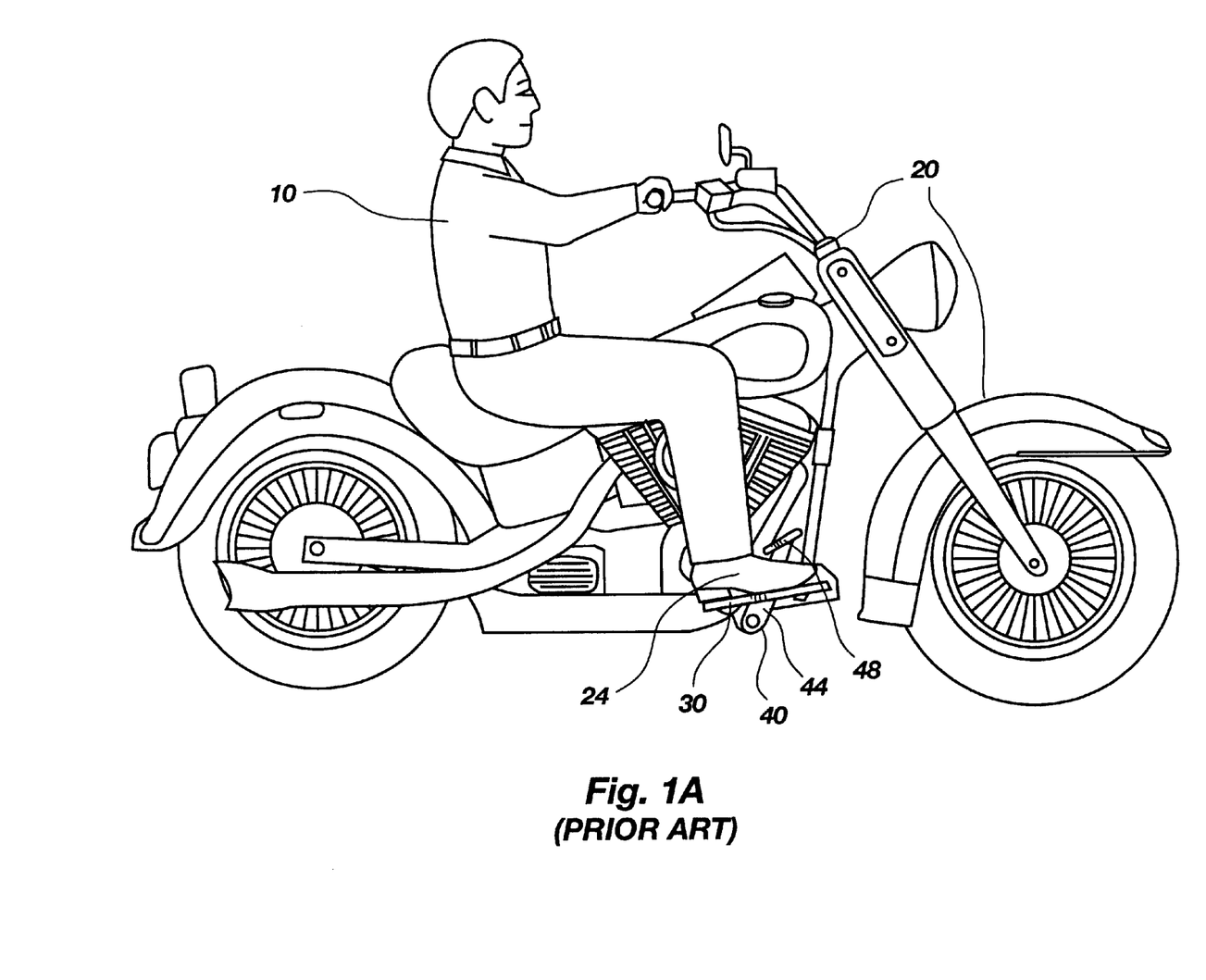
FIG. 1A shows a side view of a person riding a motorcycle having a foot board and a foot brake made in accordance with the teachings of the prior art.

One problem which is present with the configurations which use the foot boards is that the brake is very uncomfortable to use. In FIG. 1A there is shown a perspective view of a rider 10 on a motorcycle 20. The rider's foot 24 is resting on the foot board 30 near the bottom of the motorcycle 20. The brake lever assembly 40 has a brake pad arm 44 which extends upwardly above the foot board 30.

Figure 1B:
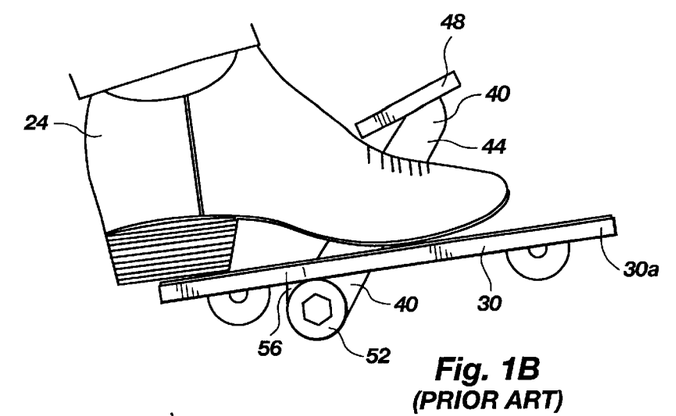
FIGS. 1B through 1D show close-up side views of the foot board and the lever arm and pedal of the prior art foot brake shown in FIG. 1A as the foot of a rider shows the different movements necessary to actuate the brake when the foot begins in the position shown in FIG. 1A.
Figure 1C:
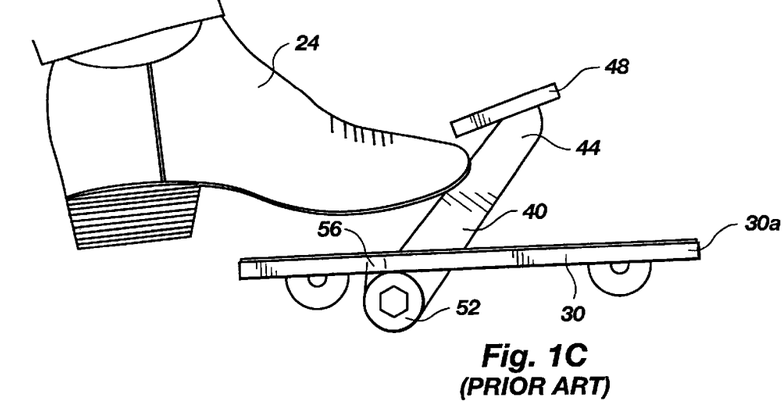
Figure 1D:
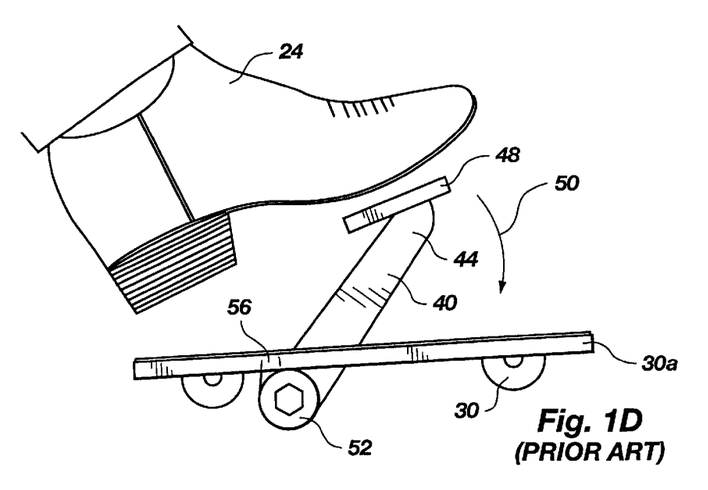

In FIGS. 1B through 1D there are shown close-up views of the rider's foot 24, the foot board 30, and the brake lever arm 40. As will be appreciated by those who have used such motorcycles, the design and positioning of the brake lever arm 40 results in a leg position which is uncomfortable, and which inhibits rapid deceleration as may be needed during an emergency.

Specifically, the brake lever assembly 40 is positioned so that a brake pad arm 44 extends upwardly and terminates at a position nearly one-half the distance of the foot board 30 distally from the front end 30a of the foot board. Likewise, the brake pad 48 attached to the end of the brake pad arm 44 is positioned several inches rearwardly from the front end 30a of the foot board 30.

The positions of the brake pad arm 44 and brake pad 48 result in the user's leg being bent at the knee at such an angle (typically about 90 degrees) that the position can become very uncomfortable on long rides. The only way to alleviate some of the pressure which is placed on the knee is to slide the foot 24 forward under the brake pad 48 as is shown in FIG. 1B. However, when the rider must use the braking assembly 40, he or she must move the foot 24 out from under the brake pad 48. Typically this is accomplished by pulling the foot 24 rearwardly as shown in FIG. 1C. Once the foot 24 has been moved sufficiently rearward to enable it to be lifted above the brake pad 48, the foot is moved into position on top of the brake pad as shown in FIG. 1D. The rider then pushes downwardly on the brake pad as indicated by arrow 50. The downward force causes the brake pad arm 44 to rotate about a pivot point 52, and moves a brake actuator arm 56 which is connected to the brake cylinder (not shown) or some other brake mechanism which actuates the brake attached to the wheel.

In order to move the foot 24 into the proper position for braking, the rider 10 must either move the foot rearwardly, lift the foot, move the foot forwardly onto the brake pad 48 and push down as shown in FIGS. 1B through 1D; or slide the foot laterally outward past the brake pad, lift the foot, move the foot inwardly until it is positioned over the brake pad and push down. Either method which is used causes fatigue if performed often, e.g. when riding in a city, and dramatically increases reaction time in emergencies. The combination of fatigue and increased reaction time significantly lessens the safety which would be present with an improved brake lever assembly. Additionally, the arcuate movement path along which the brake pad 48 follows is somewhat awkward for many riders. (The movement of the foot is more of a downward movement than a forward movement). Of course, when the user's leg is bent, less force can be exerted pressing downward, than can be achieved by extending the leg and pressing forward.

After the brake has been applied and released, the rider must go through another series of movements to return the foot 24 to the original position. In a city or other stop and go traffic, the repeated process can become annoying.

Thus, there is a need for a brake lever assembly which may be used with motorcycles having foot boards which enables the rider to place his or her foot in a more comfortable position on the foot board, which does not cause fatigue when used frequently, and which improves reaction time when braking in an emergency. Such a brake lever assembly should be simple to install and use, and should not interfere with any other aspects of motorcycle operation.

SUMMARY OF THE INVENTION

Thus, it is an object of the present invention to provide an improved foot brake lever assembly for motorcycles having foot boards.

It is another object of the invention to provide such a brake lever assembly which is less fatiguing than the prior art when used frequently during traffic congestion and the like.

It is yet another object of the present invention to provide such a brake lever assembly which does not require excessive movement of the lower leg to move the brake lever assembly, and which decreases reaction time during emergency braking situations.

Still another object of the present invention is to provide such an improved lever arm which is inexpensive, easy to install, and easy to use.

The above and other objects of the invention are realized in specific illustrated embodiments of an improved brake lever assembly having a brake pad arm configured for attachment at a first end to a brake pad, and for attachment to a motorcycle at a second end. The second end of the brake pad arm also is connected to a brake actuator arm or other actuator mechanism so that movement of the brake pad arm causes corresponding movement sufficient to engage the brakes.

In one embodiment the brake pad arm and the brake actuator arm are disposed relative to one another such that the angle of the brake pad arm relative to the brake actuator arm is greater than the prior art, thereby causing the brake pad arm to be disposed at a lower angle relative to the motorcycle. Such a position enables actuation of the brake with less foot movement. Typically, the brake of the present invention may be actuated without the heel of the rider's foot ever being lifted off the foot board 30. Rather, the front of the foot may be lifted and rotated into place over the brake. Such a range of motion causes considerably less fatigue in frequent braking situations. The prior art typically has an angle of 30–35 degrees between the brake pad arm and the brake actuator arm resulting in the angle of the brake pad arm to the motorcycle foot board being about 60 degrees. In contrast, the present invention maintains a preferred angle of 50 to 65 degrees, lowering the angle of the brake pad arm with respect to the motorcycle foot board to an angle of between about 30 and 40 degrees, and preferably between 30 and 35 degrees.

In accordance with one aspect of the present invention, the brake pad arm is sufficiently long so that it extends forwardly to a position adjacent the front end of the foot board, thereby providing more available foot room on the foot board. Additionally, the brake pad is placed in a lower position so that the brake pad can be moved without the rider lifting his or her foot from the foot board.

In accordance with another embodiment of the invention, the second end of the brake pad arm is attached to a gear mechanism in a substantially similar manner as the brake pad arms of the prior art. However, modifications are made to the brake pad arm and the adaptor for connection of the brake pad so that the brake pad is positioned forwardly and at a different angle than is present in the prior art.

In accordance with another aspect of the present invention, the first end of the brake arm is configured to receive a brake pad at an angle substantially parallel with the long axis of the brake pad arm. The orientation of the brake pad provides a more natural position which corresponds with the movement of the foot when the heel remains on the foot board.

In accordance with yet another aspect of the present invention, the brake pad arm has a brake pad support which extends less than 1 inch from the brake pad arm, and the brake pad is attached to the brake pad support so that the brake pad extends partially over the brake pad arm, thereby eliminating the necessity for the rider to move his or her foot laterally from a position below the brake pad prior to lifting of the foot. Rather, the rider's foot can be disposed on the foot board laterally outwardly from the brake pad and then pivot over the brake pad when necessary to actuate the brake.

In accordance with still another aspect of the present invention, the brake pad support has a slot formed therein, and the brake pad is configured to enable the attachment device to slide in the slot, thus allowing the user to select the exact position of the brake pad relative to the brake pad support and brake arm, to thereby enable the user to select the most comfortable position for the brake pad.

In accordance with still another aspect of the present invention, the brake pad is provided with a guide mechanism which facilitates lateral sliding of the brake pad with respect to the slotted brake pad support so that the user may select the desired lateral position of the brake pad, but which prevents rotation of the brake pad even if the attachment mechanism becomes loose.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Referring again to FIGS. 1A through 1E, there is shown the brake lever assembly 40 commonly used in the prior art. The brake lever assembly 40 is formed with a brake pad arm 44 and a brake actuator arm 56 which are connected together by a collar or sleeve 60. The brake pad arm 44 and the brake actuator arm 56 are typically disposed at an angle of 30–35 degrees relative to one another. This angle and the length of the brake pad arm 44 causes the brake pad 48 attached to the brake pad arm to be positioned inconveniently. More specifically, when the prior art device is attached to the motorcycle, the brake pad arm 44 generally extends upwardly at an angle of between about 40 and 55 degrees relative to the foot board 30. This angle places the brake pad near the middle of the foot board 30 and results in the disadvantages discussed above.

Figure 1E:
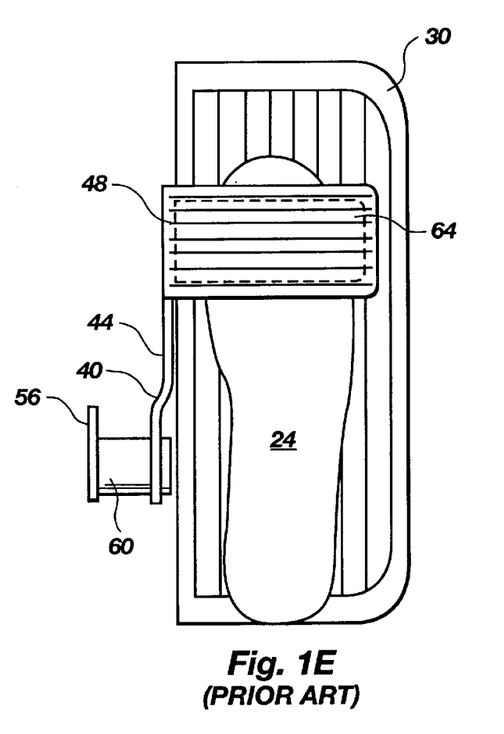
FIG. 1E shows a top view of the prior art foot brake lever assembly shown in FIGS. 1A through 1D, along with a conventional foot board.

Additionally, because the brake pad support 64 and the brake pad 48 extend so far laterally outwardly, the entire lower leg must be moved for braking if the foot has slid or been moved into position under the brake pad. While this brake configuration can be uncomfortable when used for prolonged periods of the time or in situations requiring frequent braking, the configuration has been used for approximately certain motorcycles.

Figure 1F:
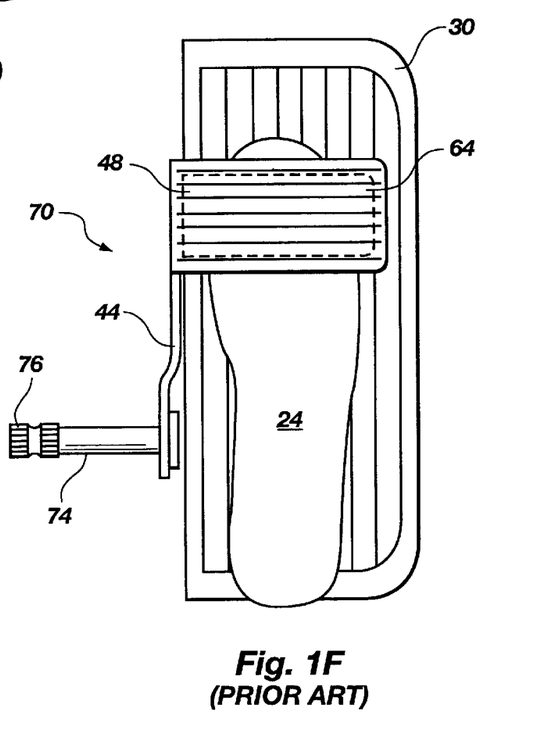
FIG. 1F shows a top view of another embodiment of a prior art foot brake lever assembly similar to that shown in FIGS. 1A through 1D, but with a different actuator mechanism.

Turning now to FIG. 1F, there is shown an alternate embodiment of the brake lever assembly, generally indicated at 70. The brake lever assembly 70 is formed with a brake pad arm 44 and a brake actuator mechanism 74 which extends generally perpendicular to the brake pad arm. The brake actuator mechanism 74 includes a plurality of gear faces 76 which engage an actuator system on a motorcycle (not show) when the gear faces 76 are rotated by downward rotation of the brake pad arm 44.

As with the embodiment shown in FIG. 1E, the brake lever assembly 70 is typically attached to the motorcycle so that the brake pad arm 44 extends upwardly and forwardly from the foot board 30 at an angle between about 40 and 55 degrees. Because the brake pad 48 and the brake pad support 64 are attached to the brake arm at angle of about 35–40 degrees, the brake pad and brake pad support are disposed primarily horizontally (as shown in FIGS. 1B through 1D) when the brake lever assembly 70 is in a resting position.

While the gear faces 76 enable adjustment of the angle of the brake pad arm 44, rotating the arm forwardly moves the brake pad 48 into a position in which it slopes downward toward the front and significantly impairs use of the brake.

Figure 2:
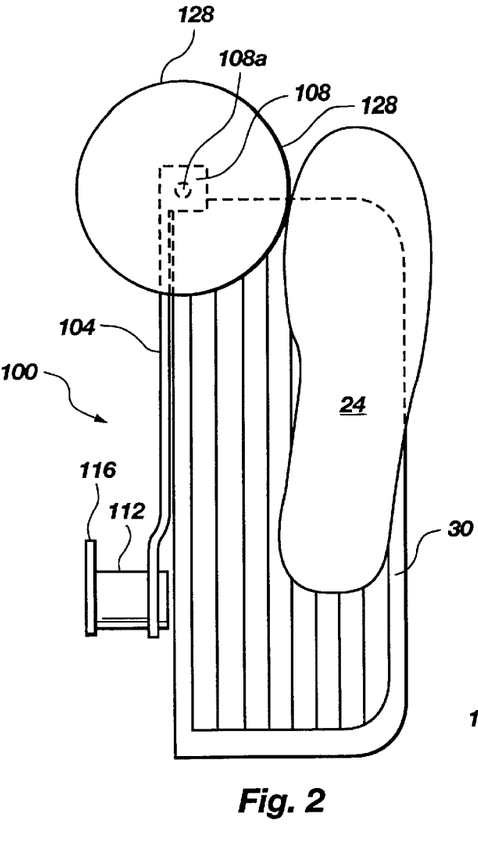
FIG. 2 shows a top, partially cut away view of a foot brake lever assembly for use with motorcycles disposed adjacent a conventional foot board in accordance with the principles of the present invention.

Turning now to FIG. 2, there is shown a top view of a brake lever assembly, generally indicated at 100, made in accordance with the principles of the present invention. Like the brake lever assembly 40 of the prior art, the brake lever assembly 100 of the present invention includes a brake pad arm 104, with a brake pad support 108 attached adjacent one end 104*a* thereof. The brake pad support 108 has a threaded hole 108*a* to receive a bolt for attaching a brake pad 128.

The opposing end 104*b* of the brake pad arm 104 is connected by a sleeve or collar 112 to a brake actuator arm 116. The sleeve or collar 112 slides onto a peg, not shown, on the motorcycle to enable the brake pad arm 104 and the brake actuator arm 116.

Unlike the prior art brake lever assembly 40 shown in FIGS. 1A through 1E, wherein the brake pad arm 44 is about 8 inches long, the brake pad arm 104 of the present invention is typically about 9 to 10 inches long. As will be discussed in detail below, the longer brake pad arm 104 enables the brake pad support 108 to be positioned at the end of the foot board 30.

Another difference between the present invention is the brake pad support 108. The brake pad support 64 of the prior art extends about 3–4 inches outwardly from the brake pad arm 44, and is tilted to an angle of about 35–40 degrees from the long axis of the brake pad arm, so that the top of the brake pad support 64 and the brake pad 48 are nearly horizontal when the brake lever assembly 40 is attached to the motorcycle (FIGS. 1A through 1D).

In contrast, the brake pad support 108 of the present invention shown is approximately between ½ and 1 inch wide and ½ to 1 inch long, and the brake pad support is disposed generally parallel with the long axis A—A (FIG. 3) of the brake pad arm 104. As will be discussed with respect to FIGS. 4A through 4C, the positioning of the brake pad support 108 enables the brake pad 128 to be placed in a position along the foot board 30 which does not cause the knee to be bent at a 90 degree angle. Additionally, because the brake pad 128 extends outwardly only about 1.5 inches on either side of the brake pad arm 104, the rider is able to slide his or her foot forward so that it extends over the end of the foot board 30 without causing the foot to be disposed below the brake pad 128. Such a position is both more comfortable for the rider and safer in the event that emergency braking is necessary.

Figure 3:
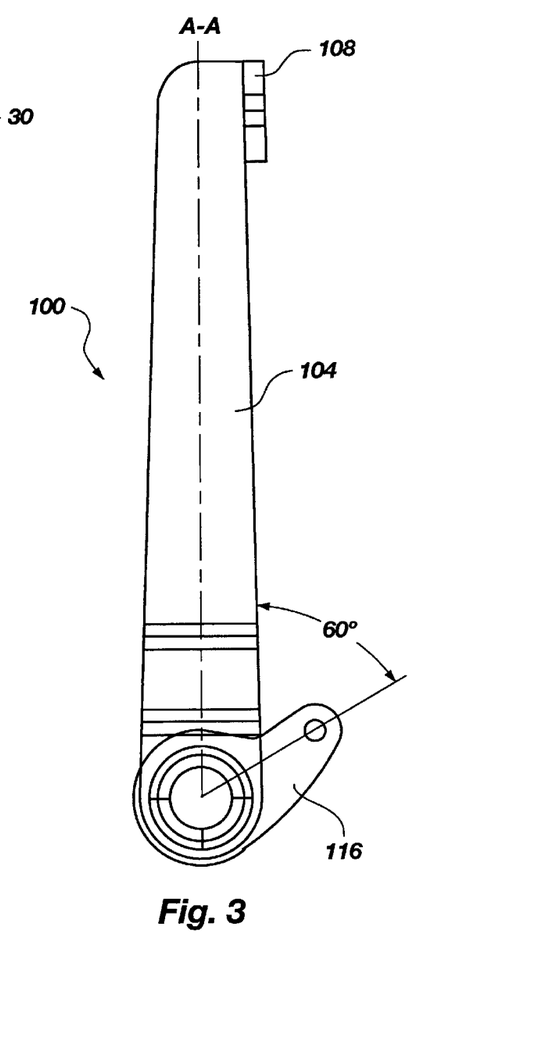
FIG. 3 shows a side-view of the brake lever assembly shown in FIG. 2.

Referring now to FIG. 3, there is shown a side view of the brake lever assembly 100, made in accordance with the principles of the present invention. Unlike the prior art, the brake pad arm 104 and the brake actuator arm 116 are not disposed at an angle of between 30 and 35 degrees. Rather, the two arms are offset between 50 and 65 degrees, and preferably about 60 degrees. The brake pad arm 104 is approximately one inch longer in the prior art, and the brake pad support 108 is disposed generally parallel with the long axis A—A of the brake pad arm. When the brake lever assembly 100 is attached to the motorcycle, the offset between the brake pad arm 104 and the brake actuator arm, the length of the brake pad arm and the disposition of the brake pad support 108 result in a braking mechanism which is easier and less tiresome to use under almost any conditions. Additionally, the resulting braking mechanism significantly reduces reaction time in emergencies.

Figure 4A:
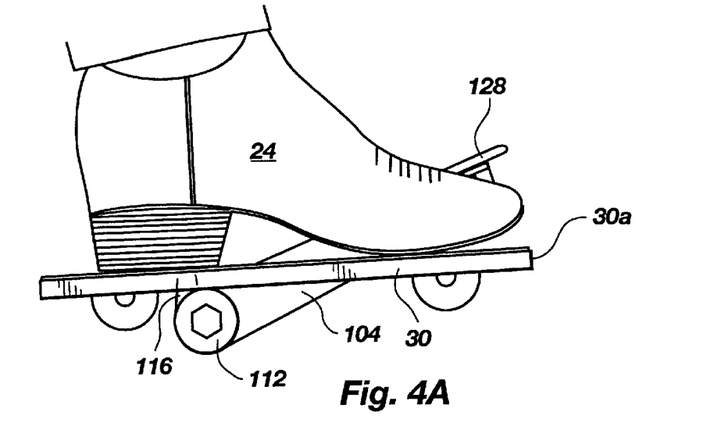
FIGS. 4A through 4C show close-up side views of the brake lever assembly used on a motorcycle having foot boards in accordance with the principles of the present invention as the foot of the rider moves through the necessary movements to actuate the brake.
Figure 4B:
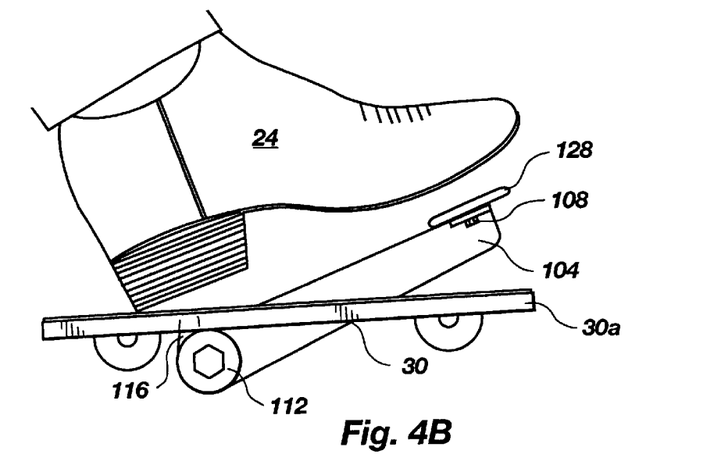
Figure 4C:
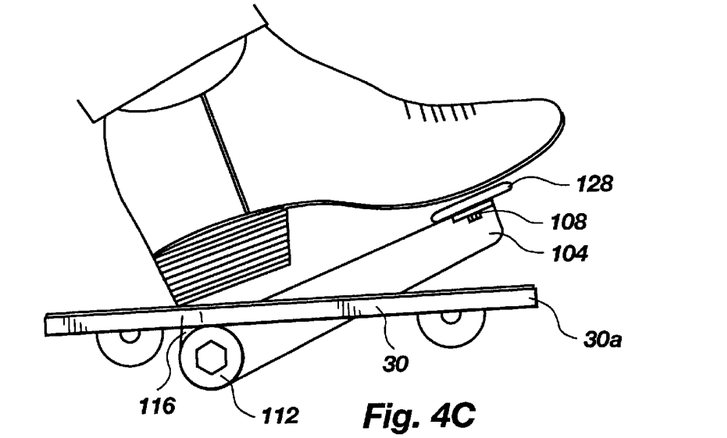

Referring now to FIGS. 4A through 4C, there are shown side views of the brake lever assembly 100 attached to a motorcycle with foot boards 30 in accordance with the principles of the present invention. The figures demonstrate the foot movements necessary to activate the brake in contrast to those shown in FIGS. 1B through 1D with respect to the prior art.

Because of the increased angle between the brake actuator arm 116 and the brake pad arm 104, the brake pad arm is positioned at a much lower angle (i.e. between about 20 and 35 degrees) with respect to the motorcycle foot board 30. This lower angle and the longer brake pad arm 104 enable the brake pad support 108 and the brake pad 128 to be positioned adjacent the front end 30*a* of the foot board.

Because the brake pad 128 is positioned adjacent the front end 30*a* of the foot board 30, the rider is able to move his or her foot forward four to six inches further than with the prior art configuration. This enables the rider to hold his or her knee in a much more comfortable position. Additionally, because the foot is not disposed underneath the brake pad 128 and because the brake pad is positioned only 2–3 inches above the level of the foot board 30, reaction time for emergency braking situations is significantly improved.

In order to brake from the position shown in FIG. 4A, the rider need only raise the front of his or her foot 24 (FIG. 4B), pivot the foot about the heel (FIG. 4C) and let the front of the foot push down on the brake pad 128 as indicated by arrow 132. As shown in FIGS. 4A through 4C, the brake pad 128 can be disposed adjacent the front end 30*a* of the foot board 30. In the alternative, the brake pad arm 104 may be long enough to position at least part of the brake pad 128 beyond the front end 30*a* of the foot board 30.

Figure 5:
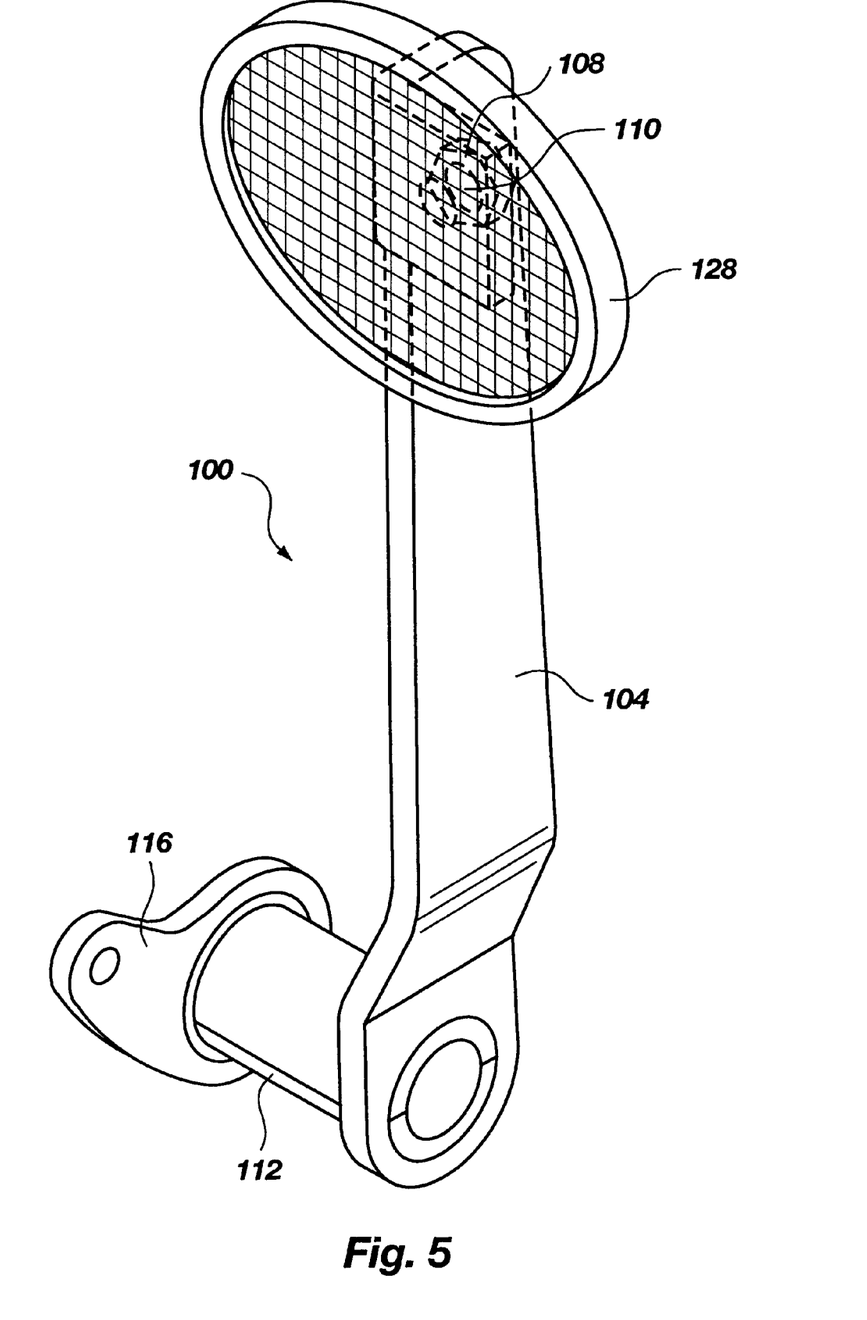
FIG. 5 shows a perspective view of the brake lever assembly of FIGS. 2 and 3 with a brake pad attached in accordance with the principles of the present invention.

Referring now to FIG. 5, there is shown a perspective view of the brake lever assembly 100, with a brake pad arm having a brake pad 128 attached thereto. Unlike the prior art wherein the brake extends 3–4 inches outwardly, the brake pad 128 is generally circular, and is disposed so that it is nearly centered over the brake pad arm. Preferably, the brake pad 128 is between 3 and 4 inches in diameter as it attached by a bolt 110, so that only about 2.5 inches is disposed to the right of the brake pad arm 104. This configuration enables a user to place his or her foot slightly over the end of the foot board 30 in the manner shown in FIG. 2.

Because the brake pad arm 104 is positioned to extend to the front end 30a of the foot board 30, the brake pad 128 may be positioned much lower, as it can move down into substantially the same plane as the foot board. Thus the rider is able to position his or her foot as far forward as the brake pad without having to move laterally to raise the entire foot for braking. Thus, the rider's foot may rest slightly beyond the front end of the foot broad 30 without interfering with braking.

When the rider must apply the brakes, he or she need only lift the front of the foot and move it inwardly over the brake pad 128 by pivoting the foot on the heel. As will be appreciated in light of the present disclosure, simply moving the front of the foot 24 while keeping the heel on the foot board 30 significantly reduces fatigue on the rider and results in a much quicker reaction time under conditions when emergency braking is necessary. In addition to ease of braking and increased reaction time, the position of the brake pad 128 provides the rider with four to six additional inches of leg room, further decreasing fatigue on long rides.

Figure 6:
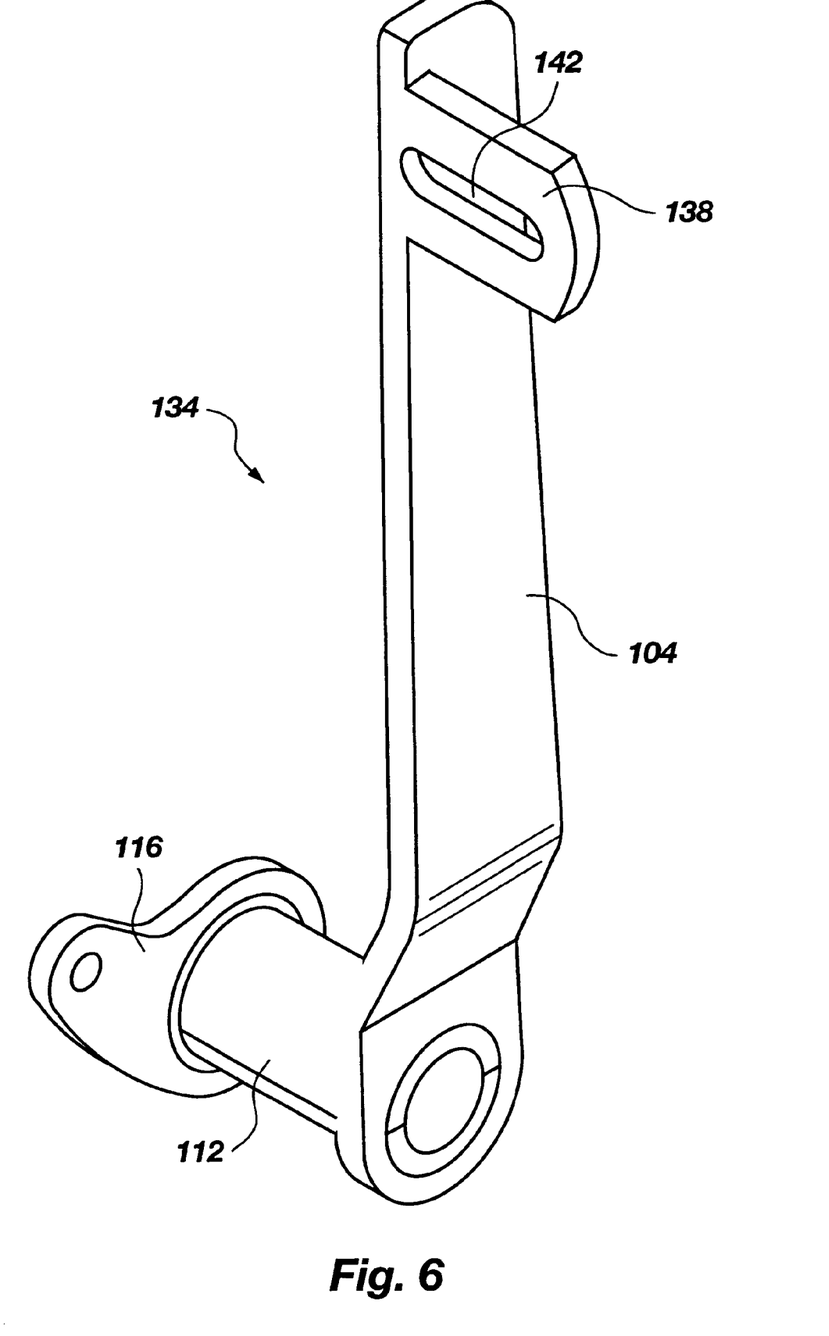
FIG. 6 shows a perspective view of a brake lever assembly similar to that shown in FIG. 5, but with a modification made to the brake pad support.

Referring now to FIG. 6, there is shown a perspective view of a brake lever assembly 134 which is similar to that shown in FIGS. 2 through 5, but with a modification made to the brake pad support 138. Rather than being ½ to 1 inch by ½ to 1 inch and simply having a hole for receiving a bolt as is shown in FIG. 5, the brake pad support 138 of the embodiment shown in FIG. 6 is approximately 1¾ inches long, and has a slot 142 formed therein. Preferably, the slot will be between ¾ and 1¼ inches long. As with the prior embodiment, however, the brake pad support is configured to hold the brake pad so it is substantially parallel with the long axis of the brake pad arm 104.

The slot 142 enables to user to adjust the position of his or her brake pad into a position which is most comfortable and which prevents interference. Thus, for example, a person with large feet may slide the brake pad to the left (i.e. toward the motorcycle) to minimize interference with foot position on the foot board 30 (FIGS. 2–4D), while a person with small feet may move the brake pad to the right (away from the motorcycle) to make the brake pad easier to reach. Additionally, while shown for lateral adjustment, the brake pad support 138 could be modified to move the position of the brake pad forwardly or rearwardly.

Figure 7:
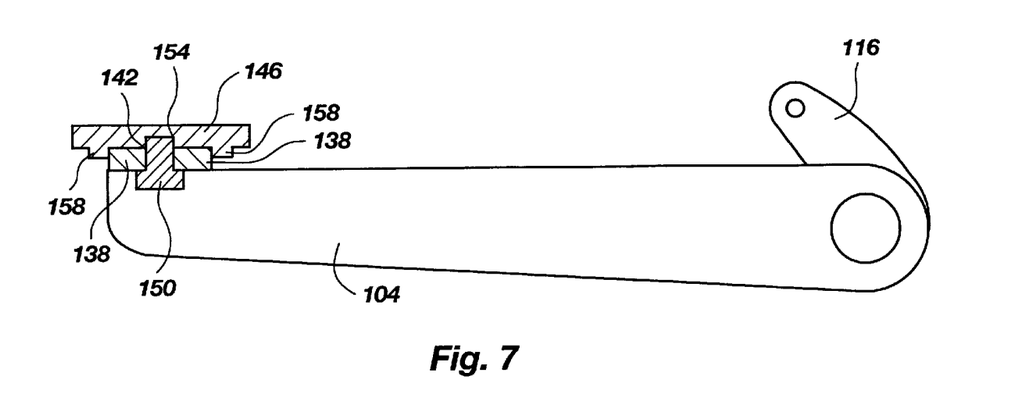
FIG. 7 shows a cross-sectional view of the brake pad support with a brake pad disposed thereon in accordance with the principles of the present invention.

Turning now to FIG. 7, there is shown a cross-sectional view of the brake pad support 138 with a brake pad 146 disposed thereon in accordance with the principles of the present invention. The brake pad 146 rests on the brake pad support 138. A bolt 150 extends through the slot 142 in the brake pad support 138 and nests in a cavity 154 in the brake pad 146. Because the brake pad support 138 has the slot 142, the brake pad 146 can be slid (toward and away from the viewer in FIG. 7) within a predetermined range of motion. Once the brake pad 146 is in the position desired by the rider, the bolt 150 is tightened, and the brake pad will stay in place.

Figure 7A:
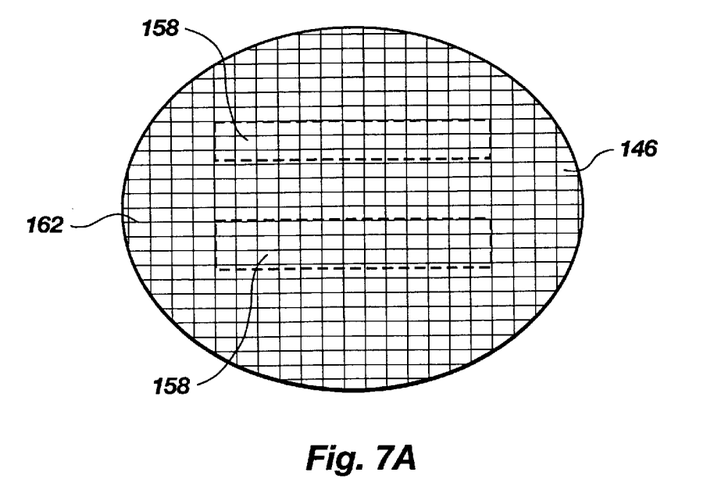
FIG. 7A shows a top view of a brake pad made in accordance with the principles of the present invention.

In addition to the bolt 150, the brake pad 146 is held in place by a pair of guides 158 which extend downwardly and thereby form a channel for receiving the brake pad support 138. While the previous embodiment is shown with a round brake pad, other shapes may be used. For example in FIG. 7A, there is shown an oval shaped brake pad 146 with a corrugated surface 162 on one side and the guides 158 on the other. This oval shape is generally a little more convenient to use and causes virtually no additional disruption to foot position on the foot board 30. The guide means help to ensure that the brake pad does not rotate during use in the event that the bolt 150 loosens.

Figure 8:
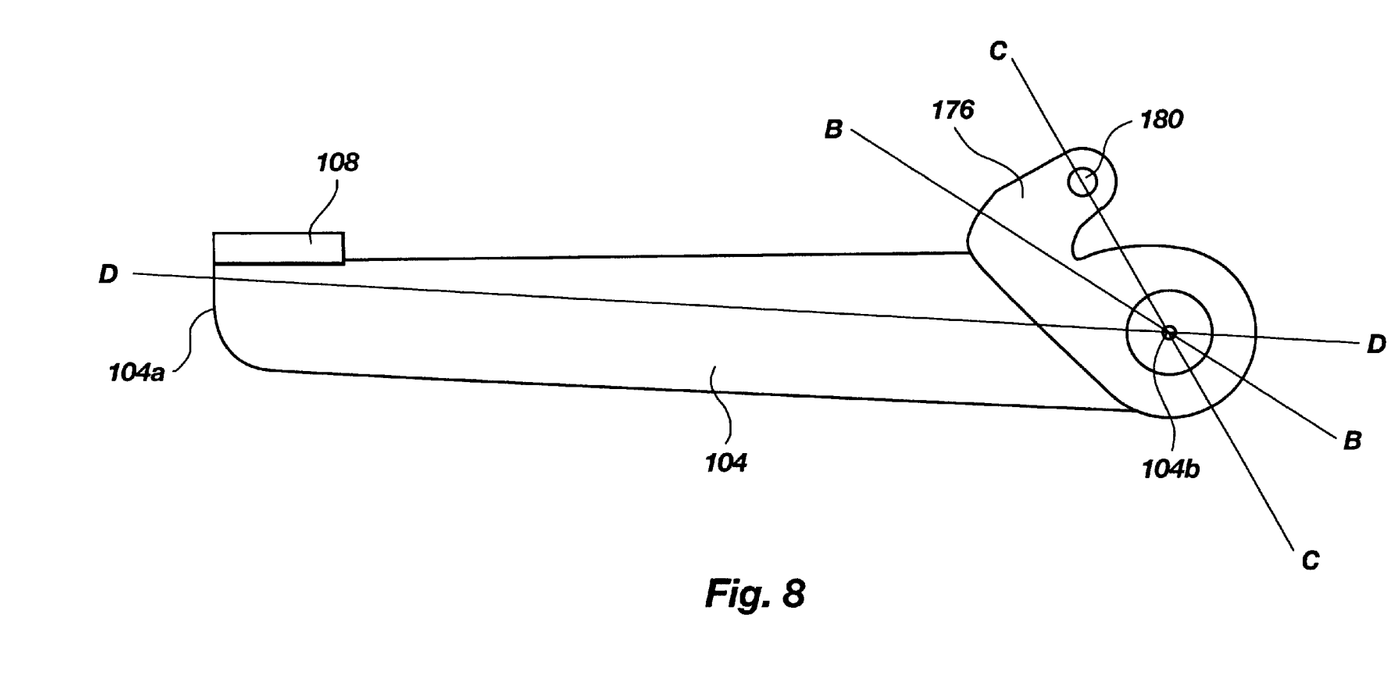
FIG. 8 shows a side view of an alternate embodiment of the present invention, wherein the angle of the actuator arm is modified.

FIG. 8 shows a side view of an alternate embodiment of the present invention, wherein the angle of the actuator arm is modified. More specifically, the actuator arm 176 extends so that the actual long axis B—B of the actuator arm is disposed at approximately 35 degrees. However, the effective long axis C—C of the actuator arm 176 (i.e. the line extending between the point of attachment of the second end 104b of the brake pad arm 104 to the motorcycle, and the hole 180 which connects to the master cylinder) remains at about 55 to 60 degrees. Thus, while numerous modifications can be made to the actuator arm 176, the principles of the invention remain the same.

The same is applicable to the brake pad arm 104. While one could curve the arm or provide other shapes, it remains important that the effective long axis of the brake pad arm 104 (i.e. the plane bisecting the end 104a of the brake pad arm 104 adjacent the brake pad support 108 and the point of attachment for the second end 104b of the brake pad arm) remains about 60 degrees from the effective long axis of the brake pad arm, or about 20 to 35 degrees relative to the foot board when attached to the motorcycle.

Figure 9:
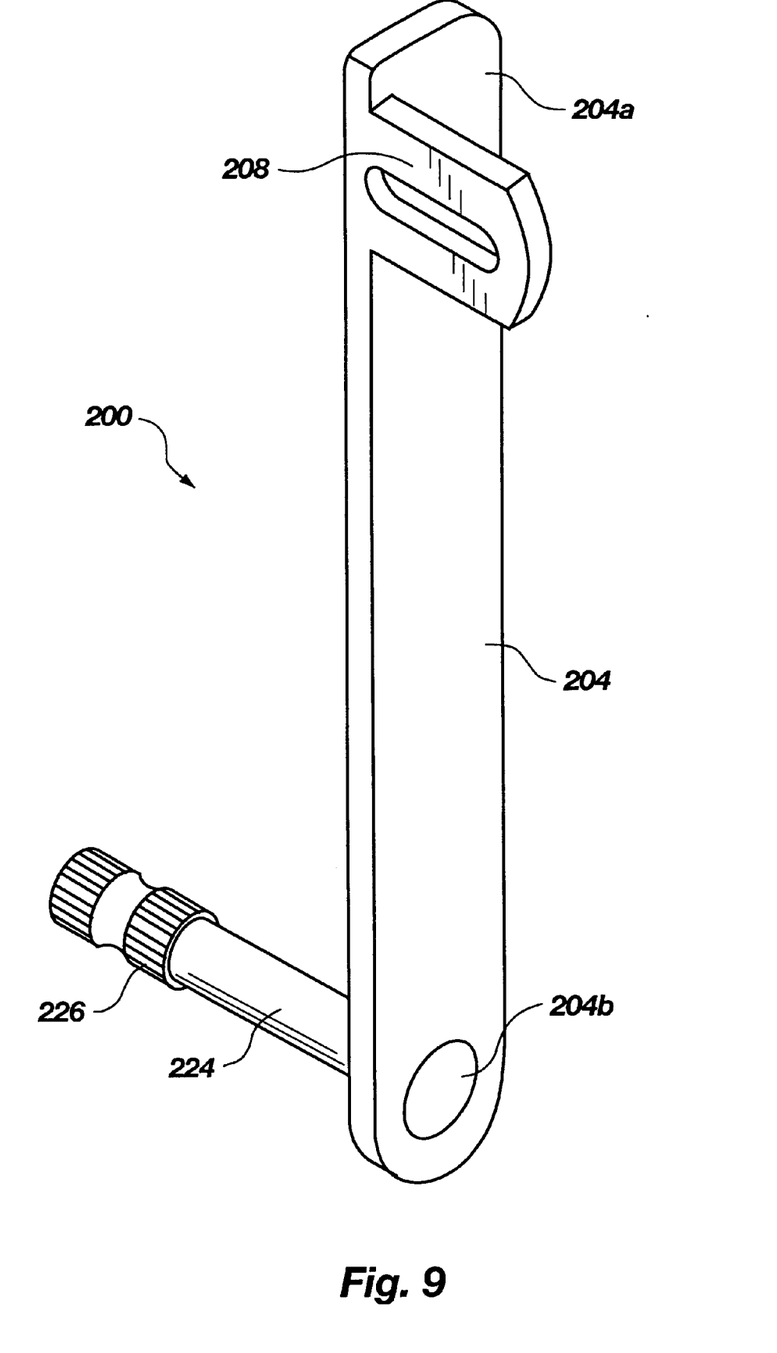
FIG. 9 shows a perspective view of an alternate embodiment of the present invention which utilizes an actuator mechanism similar to that shown in FIG. 1F, but which is modified to achieve the advantages of the present invention.

Referring now to FIG. 9, there is shown a perspective view of an alternate embodiment of the present invention which utilizes an actuator mechanism similar to that shown in FIG. 1F, but which is modified to achieve the advantages of the present invention. The brake lever assembly 200 includes a brake pad arm 204 with a first end 204a and a second end 204b. Disposed at the first end 204a is a brake pad support 208. Unlike the prior art in which the brake pad support is disposed at an angle of about 40 degrees with respect to the brake pad arm, the brake pad support 208 of the present invention is disposed generally parallel to the long axis of the brake pad arm 204, and thus substantially parallel to the effective long axis of the brake pad arm. Thus, when the brake pad arm 204 is attached to the motorcycle in accordance to the principles of the present invention, the brake pad arm 204 is disposed at an angle of between about 20 and 35 degrees from the foot board, and the brake pad support 208 is disposed so that a brake pad attached thereto is within the same angle range with respect to the foot board.

As with the prior embodiment, the brake pad support 208 is slotted to enable the user to customize the position of the brake pad (not shown). While the overall movement of the brake pad is small, the difference in braking speed and feel can be significant.

Another difference between the present invention and the prior art embodiment shown in FIG. 1F is that the brake pad arm 204 is approximately 2 inches longer (i.e. 10–11 inches). The greater length and the lower angle with respect to the foot board positions the brake pad (not shown) at the front of the foot board in a manner similar to that shown in FIGS. 4A through 4C. In addition to being disposed adjacent the front of the foot board, the brake pad is disposed between about 2½ inches and 4 inches above the foot board, in contrast to the approximate 6 inches common with the brake of the prior art. Each of these differences improves safety and makes using the brake more comfortable.

The actuator mechanism 224 is substantially the same as the prior art shown in FIG. 1F. The actuator mechanism 174 includes gear faces 226 which engage the actuator mechanism on the motorcycle, and which allow adjustment of the position of the brake pad arm 204.

Figure 10:
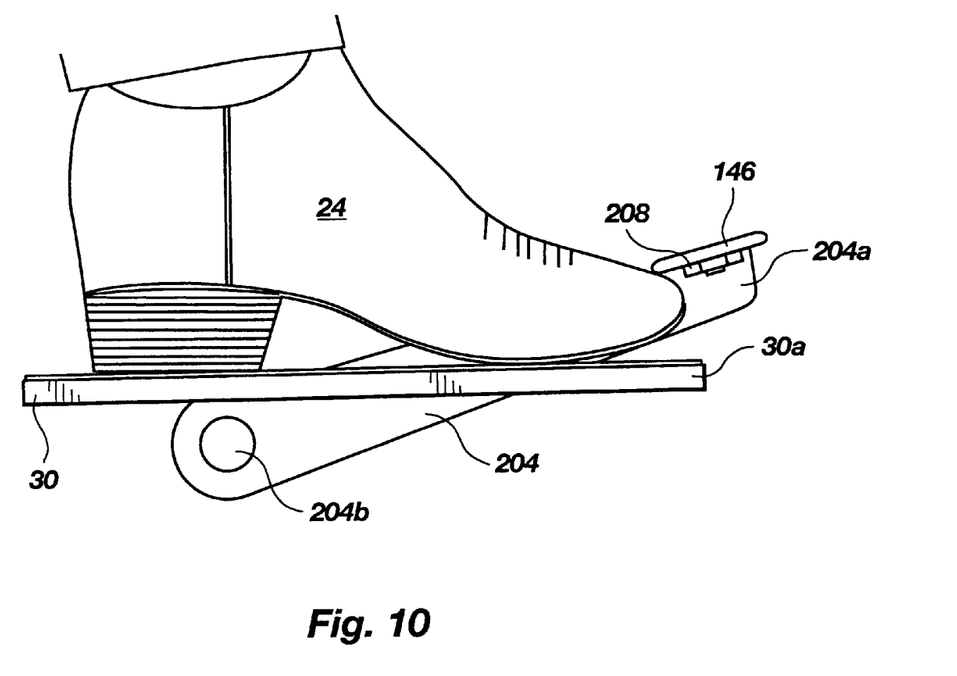
FIG. 10 shows a side view of the embodiment of the invention shown in FIG. 9.

Turning now to FIG. 10, there is shown a side, fragmented view of the embodiment of FIG. 9 disposed on a motorcycle in accordance with the principles of the present invention. The brake pad arm 204 is attached at its second end 204b to the motorcycle by the actuator mechanism (not shown) so that the brake pad arm 204 extends upwardly at an angle between about 20 and 35 degrees relative to the foot board 30. The brake pad 146 is attached to the brake pad support 208 so that it is positioned about 2½ to 4 inches above the foot board 30. Additionally, the brake pad 146 is disposed adjacent the front end 30a of the foot board 30, and at an angle between 20 and 35 degrees relative to the foot board 30. The positioning of the foot brake makes the foot brake much easier to use that those of the prior art.

In addition to the configurations discussed above, the arm has the option of being 1 inch longer to compensate for placement of the pivot shaft being moved back while retaining the benefits of the present invention. Although the schematics and drawings show somewhat the merits of the present invention, the actual advantages are immediately apparent when the prior art and the present invention are incorporated on motorcycles with foot boards, as the present invention provides significant improvements in safety and feel.

Thus, there is disclosed an improved motorcycle brake for use with motorcycles having foot boards. Those skilled in the art will appreciate numerous modifications which can be made without departing from the scope or spirit of the present invention. The appended claims are intended to cover such modifications.

What is claimed is:

1. A method for disposing a brake on a motorcycle, the method comprising:
   selecting a motorcycle having foot boards and a braking mechanism;
   selecting a brake lever assembly having an actuator means configured for activating the braking mechanism of the motorcycle and a brake pad arm attached to the actuator means;
   attaching the brake lever assembly to the motorcycle adjacent the foot boards by the brake actuator means, and positioning the brake pad arm so it extends upwardly at an angle between 20 and 35 degrees relative to the foot board.

2. The method according to claim 1, wherein the method further comprises selecting a brake lever assembly which includes a brake pad attached to the brake pad arm, and wherein the method further comprises disposing the brake pad at an angle between 20 and 35 degrees relative to the foot board.

3. The method according to claim 2, wherein the brake pad is connected to the brake pad arm by a brake pad support, and wherein the method further comprises positioning the brake pad support at an angle between 20 and 35 degrees relative to the foot board.

4. The method according to claim 1, wherein the method comprises selecting a brake lever assembly having an actuator means formed by an actuator arm, and a linear brake pad arm having a long axis which is disposed at an angle of 50 to 65 degrees from the actuator arm.

5. The method according to claim 4, wherein the method comprises selecting a motorcycle having an braking mechanism formed by an initial brake lever assembly with formed by an actuator arm and a brake pad arm which are offset at an angle of between about 30 and 35 degrees from one another, removing the initial brake lever assembly and replacing the initial brake lever assembly with a brake lever assembly having an actuator means formed by an actuator arm, and a linear brake pad arm having a long axis which is disposed at an angle of 50 to 65 degrees from the actuator arm.

6. The method according to claim 4, wherein the method further comprises attaching a brake pad to the linear brake pad arm, the brake pad being disposed parallel to the long axis of the linear brake pad arm.

7. The method according to claim 6, wherein the brake pad is circular and centered over an end of the brake pad arm.

8. The method according to claim 4, wherein the method further comprises selecting a brake lever assembly wherein the actuator arm and the brake pad arm are offset by a collar.

9. The method according to claim 1, further comprising selecting a brake pad arm which has a slotted brake pad support attached thereto.

10. A method for improving braking for a motorcycle having a foot board, the method comprising:
    selecting a motorcycle having a foot board and an initial brake lever assembly positioned adjacent thereto, the initial brake lever assembly having an actuator arm with a long axis and a brake pad arm which is generally linear and has a long axis offset from the long axis of the actuator arm between about 30 and 35 degrees;
    removing the initial brake lever assembly; and
    attaching to the motorcycle a new brake lever assembly having a linear brake pad arm with a brake pad at a forward most end, and a brake actuator arm connected to the brake pad arm and offset from the brake pad arm at an angle of between 50 and 65 degrees.

11. The method according to claim 10, wherein the method comprises attaching the new brake lever assembly to the motorcycle such that the brake pad arm extends from the motorcycle forwardly to a position adjacent the front end of the foot board at an angle between about 30 and 40 degrees and such that the brake pad is no more than 3 inches above the foot board.

12. The method according to claim 11, wherein the method comprises, more specifically, positioning the brake pad arm so that the brake pad is disposed adjacent the front end of the foot board.

13. The method according to claim 10, wherein the initial brake lever assembly has a brake pad disposed rearwardly of the front of the foot board, and wherein the method further comprises positioning the brake pad of the new brake lever assembly such that the brake pad extends beyond the front of the foot board.

14. The method according to claim 13, wherein the method comprises, more specifically, selecting a brake pad arm having a brake pad support, and attaching to the brake pad support a generally circular brake pad so that the generally circular brake pad is centered over the brake pad support.

15. The method according to claim 10, wherein the brake pad arm has a long axis, and wherein the method further comprises attaching the brake pad to the brake pad arm in such a manner that the brake pad is disposed generally parallel with the long axis of the brake pad support arm.

16. The method according to claim 10, wherein the method comprises selecting a brake lever assembly wherein the brake pad arm and the actuator arm are each attached to a collar and spaced apart from one another, and wherein the brake pad arm and actuator arm offset at an angle of about 60 degrees.

17. A method for improving braking on a motorcycle having foot boards, the method comprising:
   (a) selecting a motorcycle having an foot board with an initial brake lever assembly disposed adjacent to the foot board, the brake lever assembly being formed by a brake actuator arm and a brake pedal arm spaced apart by a collar, the brake actuator arm and brake pedal arm being offset from one another at and angle of about 30 to 35 degrees and the brake pedal arm being disposed at an angle of about 60 degrees from the foot board; and
   (b) replacing the initial brake lever assembly with a new brake lever assembly having a brake actuator arm and a brake pad arm which are spaced apart by a collar and are offset from one another at an angle of 50 to 65 degrees, and positioning the brake lever assembly such that the brake pad arm is disposed at an angle of between about 30 and 40 degrees from the foot board.

18. The method according to claim 17, wherein the method comprises selecting a new lever assembly having brake pad arm which is at least one inch longer than the brake pad arm of the initial lever assembly.

19. The method according to claim 18, wherein the brake pad arm of the new lever assembly is at least 2 inches longer than the brake pad arm of the initial lever assembly.

20. The method according to claim 17, wherein the brake pad arm of the new lever assembly is linear.

* * * * *